Sept. 19, 1944.　　　　H. P. SMITH　　　　2,358,539
TRACTOR IMPLEMENT ATTACHMENT
Filed Oct. 9, 1940　　　4 Sheets-Sheet 1

Inventor
Hiram P Smith
By Paul O. Pippel
Atty.

Sept. 19, 1944.  H. P. SMITH  2,358,539
TRACTOR IMPLEMENT ATTACHMENT
Filed Oct. 9, 1940  4 Sheets-Sheet 2

Inventor
Hiram P. Smith
By Paul O. Pippel
Att'y.

Sept. 19, 1944. H. P. SMITH 2,358,539
TRACTOR IMPLEMENT ATTACHMENT
Filed Oct. 9, 1940 4 Sheets-Sheet 3

Inventor
Hiram P. Smith
By Paul O. Pippel
Att'y.

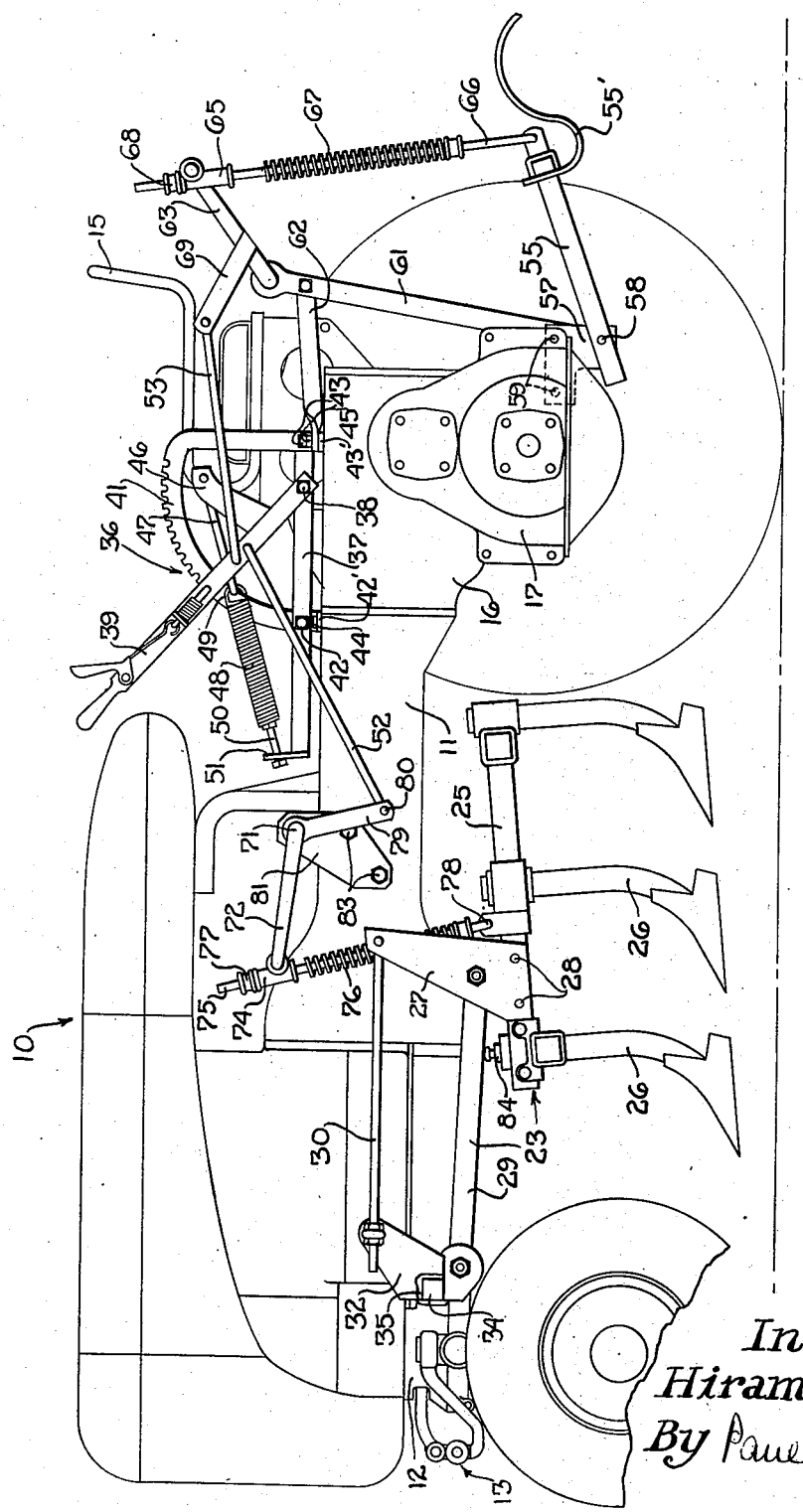

Patented Sept. 19, 1944

2,358,539

UNITED STATES PATENT OFFICE 2,358,539

TRACTOR IMPLEMENT ATTACHMENT

Hiram P. Smith, Canton, Ill., assignor to International Harvester Company, a corporation of New Jersey Application October 9, 1940, Serial No. 360,457

5 Claims. (Cl. 97—47)

This invention relates to tractor-mounted implements and more particularly to means for mounting these implements on the tractor.

The main object of the invention is to provide a tractor cultivator with a simplified means for the attachment of the cultivator to the tractor, whereby the same may be readily assembled to the tractor and easily detached from the same.

It is another object of the invention to provide a tractor with lifting means for the implement mounted on the forward portions of the same, wherein the lifting means may be located midship of the tractor and wherein this lifting means may be easily removed from the unitary body structure of the tractor as a unit.

It is still another object of the invention to provide a rig arrangement wherein the rig beam will be positively tilted forwardly upon the same being lifted to have the rear shovel raised higher than any of the shovels forwardly thereof and to thereby reduce the breakage of plants, upon swinging of the tractor and its attachment at the end of the plant row.

It is still another object of the invention to provide means for the attachment of the rear rigs of the cultivator and of the lifting means of the same, whereby only minimum fastening of the same to the tractor is necessary.

According to the present invention the cultivator rig units are attachable to the steering housing of the tractor. This steering housing has associated therewith squared socket openings extending transversely therein to be presented respectively from each side of the tractor. The cultivating rig unit includes an attaching means which has a projecting portion of square cross-section adapted to fit within the squared socket openings at each side of the tractor. Means also may be provided for securing the squared projecting portions of the cultivating units within the socket openings. This means for securing may take the form of a set screw in the gear housing extending into the opening and into contact with the projected portion of the cultivating unit.

As means for lifting the cultivator rigs, there is included a rockable means of a type adapted to be connected midship of the tractor and is removable therefrom as a unit.

Associated with the cultivator rig beam of each cultivator unit there is provided a vertically extending adjustable projection adapted to engage with the lower link upon the raising of the rig to thereby bear down on or depress the forward end of the rig beam to pivot the same with respect to the end of the drag-link to throw the rear shovel of the cultivator rig to a position higher than the forward shovel of the rig upon the lifting of the cultivator rigs.

The rear rigs and the actuating rock-shafts therefor are preferably connected as a unit to the rear of the tractor. Also, the manual lifting means and its helper spring are connected as a unit to the tractor. By maintaining the helper spring as a part of this adjusting unit, the same will not have to be removed individually upon disconnecting of the cultivator from the tractor nor will there be any necessity for the same to be readjusted upon the attachment of the cultivator to the tractor.

For other objects and for a better understanding of the various features of the present invention, reference may be had to the following detailed description taken in connection with the accompanying drawings, in which.

Figure 3:
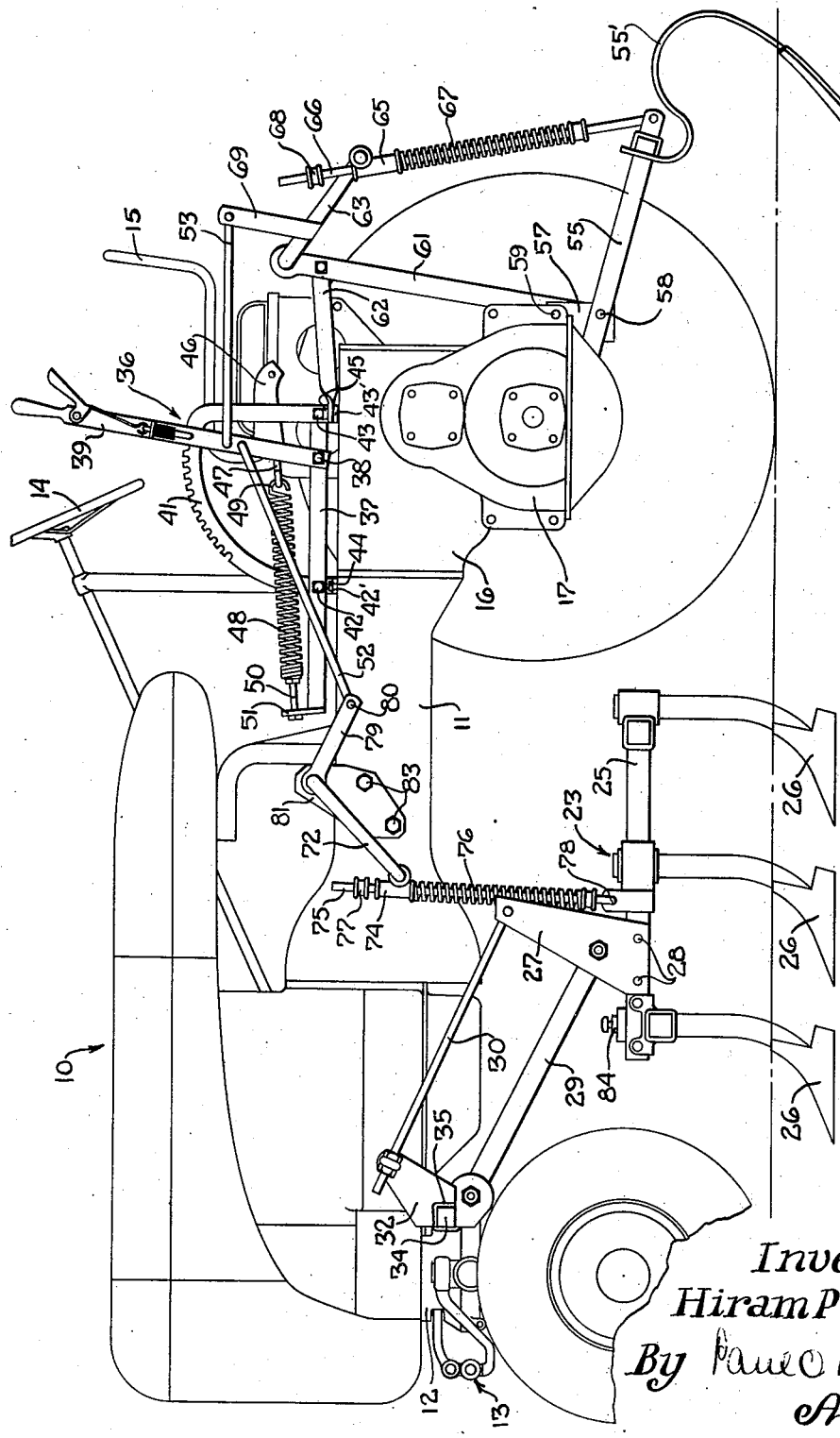

Figure 3 is a side view in elevation of the tractor and the cultivating attachment of the present invention showing particularly the cultivating rigs at the left side of the tractor in their ground-working position; and, Figure 4 is a view similar to Figure 3 of a tractor but where the cultivating rigs of the front and rear have been raised to their transport position and illustrating particularly the function of the vertically projected means on the cultivator rig beam to effect raising of the rear shovel on the rig beam higher than the forward shovel on the rig beam.

Referring now to the drawings, there is shown generally a tractor or tool-supporting frame 10 having a unitary body structure 11 to the forward end of which is connected a steering gear housing 12, to which is pivoted a steering structure 13 for steering adjustment by the steering wheel 14 located rearwardly on the tractor near to the operator's seat or station 15. Connected to the unitary body structure 11 at its rear is a transmission and differential housing 16 having depending axle housings 17 at each side thereof. This tractor is of the offset type wherein the operator's station is located at a position laterally removed from the unitary body structure of the tractor. By locating the operator in this position he is enabled to have a better view of the plant row while cultivating the same. In order that the operator may be free to have good vision downwardly and at a point near to the operator's station, the unitary body structure is made narrower at this location somewhat midship of the tractor, as indicated at 18.

The steering gear housing 12 has associated therewith means for the attachment of groundworking tool rigs. This means may take preferably the form of a projected portion 19 having socket openings 21 into which may be projected the connecting portions of the cultivating units; there is such a portion 19 associated with the steering gear housing 12 extending so as to have an opening 21 at each side of the tractor for the connection of the cultivating units 22 and 23, respectively. These openings 21 are preferably squared and adapted to receive a squared portion of the attaching means of the cultivating unit. When the unit has been connected to the tractor by the insertion of the squared connecting portions within the squared socket opening, the same may be secured in that position by means of set screws 24 threaded into the gear housing portion 19. The gear housing 12 forms a part of the tractor when it is attached to the main body portion 11 and is thereby rigid with respect thereto.

Description will now be made of one of the cultivating units, and it will be understood that this description may readily apply for the other cultivating unit adapted to be located at the opposite side of the tractor and which differs only in that the transversely extending square bar attaching portion extends transversely in the opposite direction. Each cultivating unit includes generally a rig beam 25 adapted to extend longitudinally with respect to the tractor and on which is located the usual cultivating shovels 26 connected in longitudinally spaced relation therealong. At one location along the rig beam and nearer to the forward end thereof there is rigidly attached two vertically extending bracket plates 27 which are attached by means of bolts 28. Extending forwardly from these spaced plates 27 and connected thereto are two spaced links 29 and 30, the lower link 29 being mainly a draft or drag link and located between the spaced plates while the upper link 30 being adapted to maintain the bracket 27 and the rig beam 25 against vertical rotation during the operation of the cultivator. The forward end of these links may be connected to a bracket structure 32, which may be likewise a spaced plate arrangement, so that at least one of the links may be located between the plates, and this bracket structure may include a transversely extending square bar member 34 welded to the spaced plates 33, as indicated at 35.

It will now be seen that there has been provided in the spaced plates 27, the spaced links 29 and 30, and in the bracket structure 32, means for attaching the rig beam 25 with its shovels 26 thereon to the steering gear housing 12 of the tractor. While it has been shown that socket openings have been provided in the steering gear housing 12, which, in the type of tractor disclosed, provide a very convenient location for the connection of cultivating units, it shall be understood that such openings of this type might be provided at any location within the body portion of a tractor. The transverse bars 34 are removable with the units, all of which makes for simplicity in the attachment and detachment of cultivator units to the tractor. Since the square openings 21 are adapted to receive an attaching bar 34, which is also of square cross-section, it will be apparent that any tendency for the bracket structure 32 and the cultivating rig to rotate as a unit with respect to the tractor is prevented. The flat squared surfaces of the transverse bar 34, registering flatly with the squared faces of the socket opening, prevent any tendency for twisting of the bracket structure 32 and its square bar with respect to the tractor.

On the top of the tractor bar 11, there may be mounted a combined helper spring and adjusting lever unit indicated generally at 36. This unit includes a longitudinally extending base member 37 to which is pivotally connected at 38 an adjusting lever 39 adapted to have locking engagement with a quadrant 41 extending vertically from the base element 37 and connected to the same at 42 and 43. The lower ends of the quadrant 41 have laterally projected portions 42' and 43', through which may extend the bolts 44 and 45 for the attachment of the combined unit to the top of the body portion of the tractor. The lever element 39 may have an arm 46 rigidly connected thereto for the connection of a link member 47 extending forwardly and connected to the rearward end of helper spring biasing means 48 at 49. The forward end of the helper spring 48 may be connected by adjustable means 50 to a vertically extending flange portion 51 on the forward end of the base element 37. To the adjusting lever 39 may be attached the forward extending and rearwardly extending operating links 52 and 53, respectively. It will be apparent that, when these operating links 52 and 53 are detached from the lever 39 and when the attaching bolts 44 and 45 are detached, this helper spring and the quadrant adjusting means including the quadrant 41 and the lever 39 may be removed from the tractor as a unit. By being able to so remove the helper spring 48 and at the same time leaving it in its initially tensioned position, such as effected by the adjusting means 50, necessity for readjustment of the spring 48 upon relocating the same on the tractor is unnecessary. By such a unitary structure fighting with the spring, which has usually been present in the connecting and disconnecting of the same, has been eliminated. All of this has made for simplicity in the attachment and detachment of the cultivators to the tractor.

Means will now be described for the attaching of the rear parts of the cultivator attachment to the rear portion of the tractor. In the working out also of these parts, it has been the object to make the same as simple as possible. To the rear of the tractor there are pivotally connected rig beams 55 and 56 located respectively at opposite sides of the tractor, and each of which is connected respectively to plates 57, as indicated at 58, for their attachment to the depending axle housings 17. These plates 57 are of reverse L-shaped and are adapted to be connected by means of screw bolts 59 to the inner faces of the axle housings 17. By mere removal of these screw bolts 59, the rear rigs are substantially made free of the tractor. The rear rigs 55 and 56 may each have a rear shovel 55' and 56', respectively, which may be adapted to serve as track sweeps for the rear wheels of the tractor.

Anchored to the tractor by one of the attaching bolts 59, which retain plates 57, are vertically extending rock-shaft supporting members 61 adapted to be braced at their upper ends of the tractor against fore and aft movement by means of straps 62. The strap on the left-hand side of the tractor may be connected to the tractor by means of the same bolt screw 45 which serves to connect the combination adjusting means and spring unit 36 to the top of the tractor. The strap 62 at the right-hand side of the tractor may be connected thereto at some convenient location. Once the vertically upstanding members 61 have been fixed, a rock-shaft pivoted in the upper ends of these members 61 will be in position for effecting lifting of the cultivating rigs 55 and 56 through their arms 63 and 64. It will be noted that these arms are so positioned with respect to the upper portion of the members that the rock-shaft serves to brace the members laterally. The rearward ends of the arms 63 and 64 are connected in the usual manner to the swivel brackets 65 through which pass the lifting links 66 having the usual pressure spring 67 associated therewith, so that the brackets will engage with a collar 68 on the upper end of the pressure rods 66 to effect lifting of the rigs when the rock-shaft is pivoted forwardly. The arm 63 of the rock-shaft at the left-hand side of the tractor may have rigidly secured thereto a forwardly extending arm portion 69 for the connection of the rearwardly extending link 53 from the adjusting lever 39. By this means, and when the lifting lever 39 is moved forwardly, the rock-shaft and its arms 63 and 64 will rotate forwardly to effect the lifting. It should now be apparent that those parts of the cultivator located on the rear portion of the tractor may be removed substantially as a unit by merely removing the set screws 59 and by the disconnecting of the straps 62 at their forward ends.

In order to provide a lifting means for the cultivating units 23 connected to the forward portions of the tractor by means already described, there is provided another rock-shaft having the arms 72 and 73 projecting substantially forwardly for connection with a swivel bracket 74, through which pass the lifting rods 75 having the usual pressure springs 76 and connected at the lower ends to the rig beams 25, as indicated at 78. Rigid with the upper ends of the lift rod 75 are the collars 77 adapted to be engaged by the swivel bracket 74 during the lifting operation. Also rigid with the rock-shaft 71 is a downwardly extending operating arm 79, to the lower end of which may be connected the operating link 52, as indicated at 80. To serve as a bearing or bracket structure for the rock-shaft 71, there is provided a pair of spaced plates 81 adapted to be respectively connected to the narrow body portions 18 substantially midship of the tractor and by means of screw bolts 83. By the mere removal of the screw bolts 83, the lifting structure for the forward rigs may be removed from the tractor as a unit. It should thus be apparent that a simple lifting structure has been adapted for connection to a unitary body structure having narrowed midship portions and wherein the same may be readily removed upon detachment of the cultivator from the tractor. It will be further apparent that the lifting lever 39, through the operating links 52 and 53, serves to lift the forward cultivator rigs and the rearward cultivator rigs in unison, and as well will adjust the same in unison. The helper spring 48, connected in the manner herein disclosed, serves to aid the lifting of both front and rear cultivating rigs.

Referring now particularly to the forward rig connection, there has been provided means for effecting lifting of the shovel on the rearward end of the beam 25 higher than the shovel on the forward end of the rig beam 25. It so happens that, during constant operation of any cultivating or ground-working attachment, there will be formed a certain looseness in the connection of the links 29 and 30 with the bracket structures 27 and 32. If this looseness is of a sufficient amount, the rig beams 25 will droop considerably at their rearward ends when the rigs are raised to their transport position. The drooping of the rig beams 25 prevents easy manipulation of the tractor at the end of the field, in order to have these rear shovels avoid the standing crop. Thus, it is desirable that the rear shovels be raised positively higher than the forward shovels to improve the clearance of the cultivator rigs as the tractor is turned about at the end of the field.

As a means to effect this higher raising of the rear shovel, there has been provided a vertically extending projecting means 84 which may be vertically adjustable, depending upon the degree of angling of the rig beam 25 that is desired. This adjustable projecting means is so located laterally that the top of the same will engage with the under face of the drag-link 29, as shown particularly in Figure 4, upon the rigs being raised to their transport position. As this operation is effected, the lower face of the drag-link 29 will engage with the adjustable upright portion 84 and will thereby effect downward movement or depression of the forward portion of the rig beam 25 to effect pivoting of the same about the rearward end of the drag-link 29, to project upwardly the rear portion of the rig beam 25, so that it will take the angle shown in Figure 4, or any other angle, depending upon the adjustment of the means 84.

Figure 1:
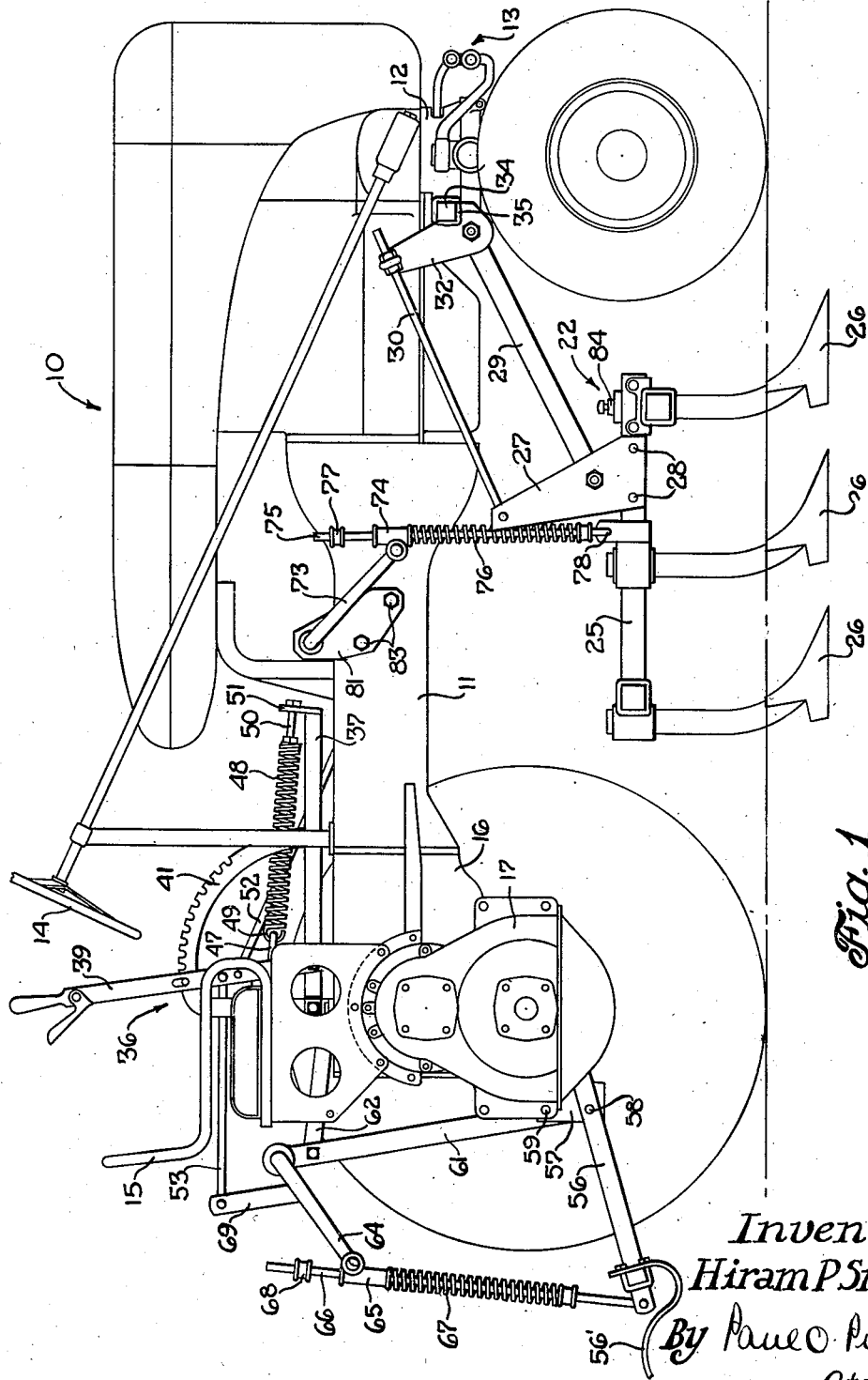
Figure 1 is a view in side elevation of the right side of the tractor with the tractor cultivator of the present invention attached thereto.
Figure 2:
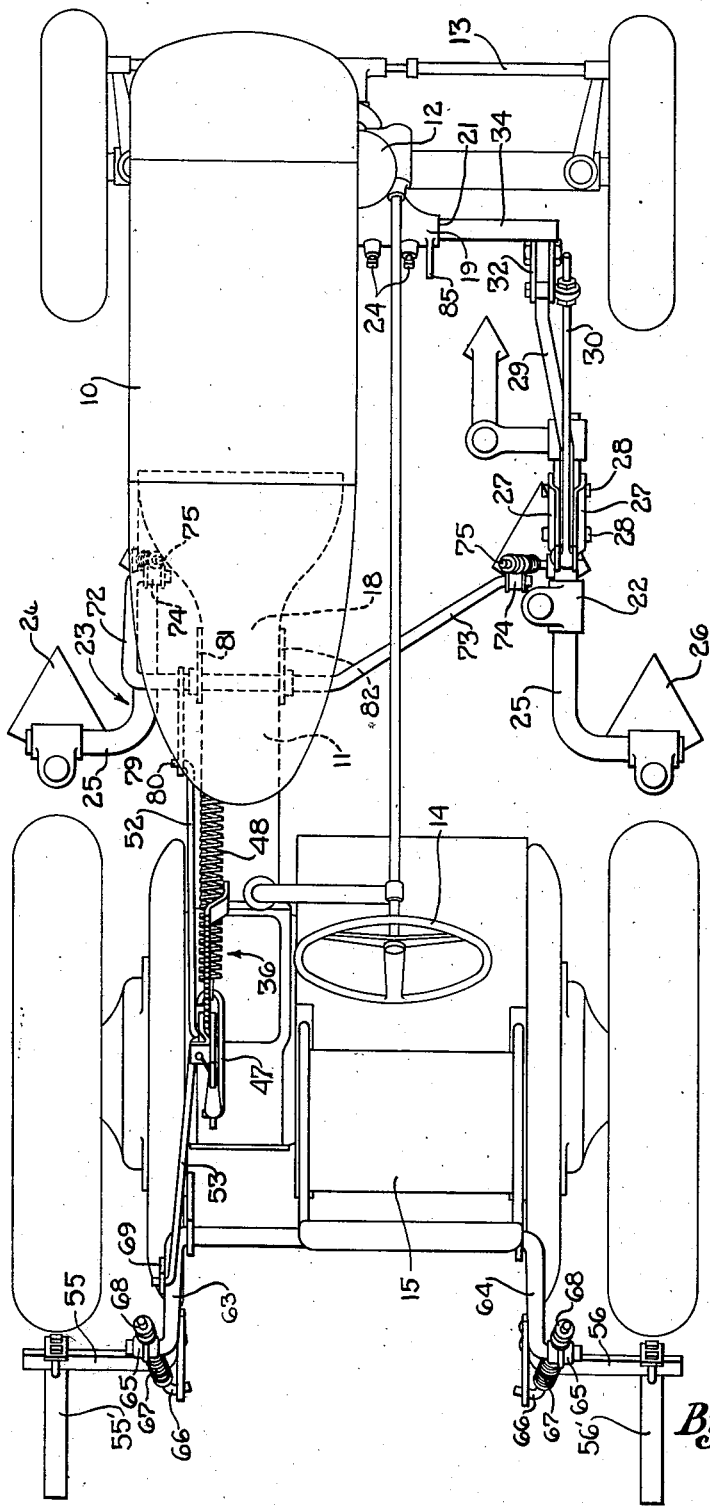
Figure 2 is a plan view of the tractor and of the cultivator attachment of the present invention attached thereto.

While there has been described a preferred form for the attachment of cultivator rigs to the steering housing 12 of the tractor, it should be apparent that this same steering housing may serve as a means for connection of other implements to the tractor, such as plows or even other forms of cultivating units, as by means of a projection 85, as seen in Figure 2. The forward end of the plow beam may be connected to this projection 85 by a bolt or pin means, whereby draft will be received from this gear housing.

While various changes may be made in the detail construction of the various features of the present invention, it shall be understood that these changes shall be within the spirit and scope of the present invention as defined in the appended claims.

What is claimed is:

1. In combination, a tractor, a cultivator rig adapted to be lifted including a rig beam and shovels located in longitudinally spaced relation along the beam, means for connecting the rig beam to the tractor to extend longitudinally with respect thereto including a drag-link pivotally connected to the rig beam, and means adapted to cause engagement of the rig beam with the drag-link to effect forward pivotal movement of the rig beam about its pivotal connection with the drag-link whereby the rear shovel on the beam will be raised higher than a shovel forwardly thereof when the rig beam is lifted.

2. In combination, a tractor, a cultivator rig adapted to be lifted including a rig beam and shovels located in longitudinally spaced relation along the beam, means for connecting the rig beam to the tractor to extend longitudinally with respect thereto including a drag-link pivotally connected to the rig beam, and means adapted to cause engagement of the rig beam with the drag-link to effect forward pivotal movement of the rig beam about its pivotal connection with the drag-link whereby the rear shovel on the beam will be raised higher than a shovel forwardly thereof when the rig beam is lifted, and said engagement means being adjustable to vary the amount of pivotal movement of the rig beam.

3. In combination, a tractor, a cultivator rig adapted to be lifted including a rig beam and shovels located in longitudinally spaced relation along the beam, means for connecting the rig beam to the tractor including a bracket structure rigid with the rig beam and spaced links pivotally connected with the bracket structure and with the tractor, means associated with the rig beam forwardly of the connection of the bracket structure thereto and adapted to have engagement with one of the spaced links when the rig is lifted to depress the part of the rig beam forwardly of the connection with the bracket structure, whereby any looseness in the connections of the spaced links with the tractor and bracket structure will be taken up and the shovels on the beam rearwardly of the bracket will be raised higher than a shovel on the beam forwardly of the bracket structure.

4. In combination, a tractor, a cultivator rig for the tractor adapted to be lifted and including a rig beam with shovels located in longitudinally spaced relation therealong, means for connecting the rig beam to the tractor including spaced plates connected respectively to opposite sides of the rig beam and vertically spaced links connected with the tractor and with the spaced plates, at least the lower of said links being disposed between the plates in its connection therewith, means associated with the top of the rig beam forwardly of the spaced plates and adapted to engage with the bottom of the lower link when the rig is lifted to depress the part of the rig beam forwardly of the plates, whereby any looseness in the connections of the spaced links with the spaced plates and with the tractor will be taken up and the shovels on the beam rearwardly of the plates will be raised higher than a shovel on the beam forwardly of the plates.

5. In combination, a tool-supporting frame, a working tool rig adapted to be lifted including a longitudinally extending rig beam, means for connecting the rig beam to the tool-supporting frame extending longitudinally with respect thereto including a drag-link pivotally connected to the rig beam, and means adapted to cause engagement of the rig beam with the drag-link to effect forward pivotal movement of the rig beam about its pivotal connection with the drag-link when the rig beam is lifted.

HIRAM P. SMITH.